Patented Aug. 24, 1926.

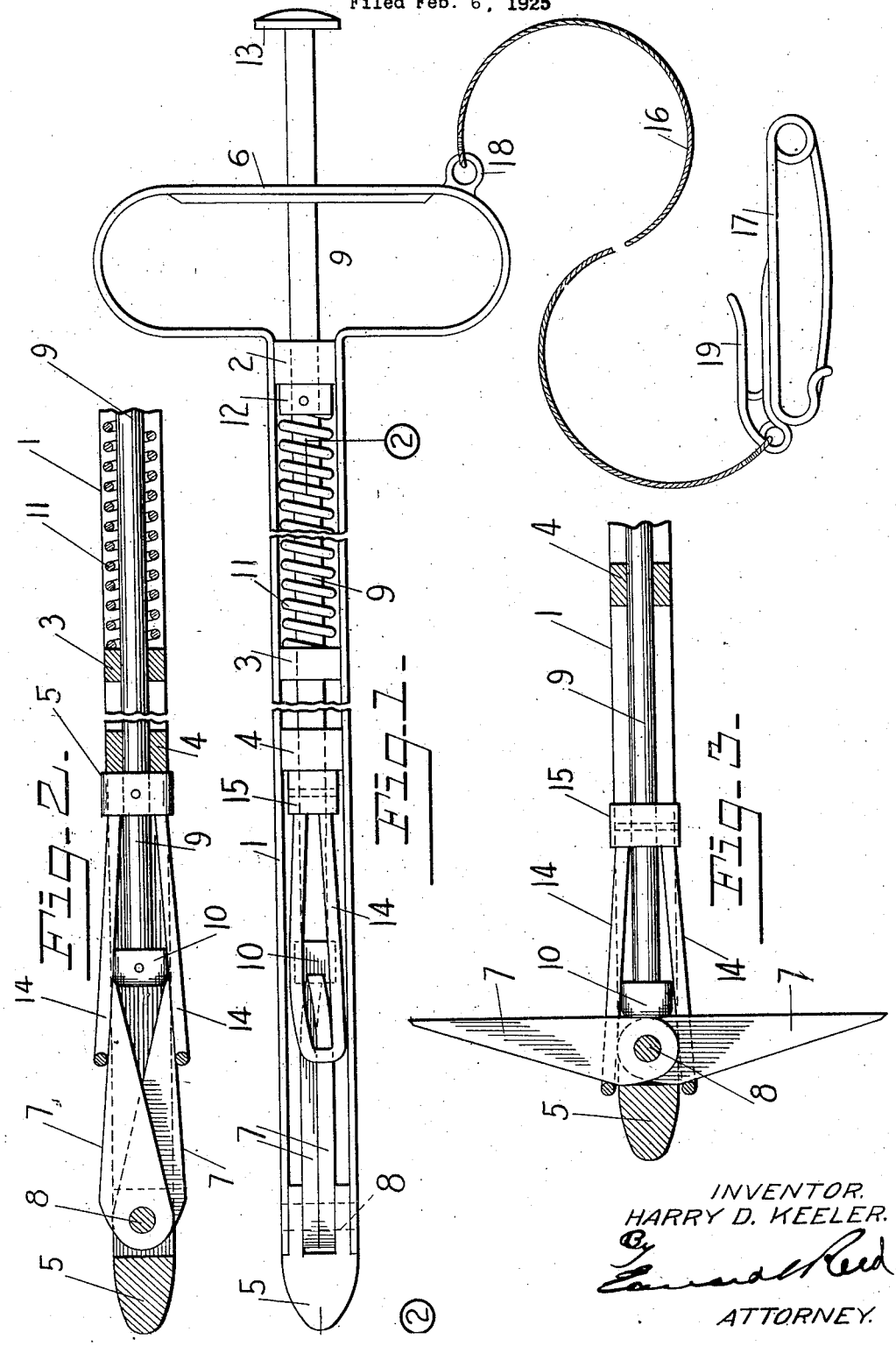

1,597,472

UNITED STATES PATENT OFFICE.

HARRY D. KEELER, OF MARION, OHIO.

GAFF.

Application filed February 6, 1925. Serial No. 7,281.

This invention relates to a gaff for landing fish and for like purposes.

When a fish, and more particularly a scale fish, has been hooked it usually comes to the surface with its mouth open and when the fisherman attempts to grasp the fish by the gills to land it he is in danger of having his hand cut by coming in contact with the teeth of the fish as the latter thrashes about at the end of the line or of being bit by the fish; and he is in like danger when he attempts to remove the hook from the fish's mouth.

One object of the invention is to provide a device by means of which a fish which has been hooked and brought to the surface may be quickly and easily landed and its mouth held open while the hook is being removed.

A further object of the invention is to provide such a device which the fisherman can manipulate with one hand while he holds his rod or removes the hook with his other hand.

A further object of the invention is to provide such a device which will be simple in construction and operation, of light weight and of a strong durable character.

Other objects of the invention will appear as the device is described in detail.

In the accompanying drawings Fig. 1 is a side elevation of a device embodying my invention; Fig. 2 is a sectional view taken on the line 2—2 of Fig. 1, showing the barbs closed; and Fig. 3 is a similar view showing the barbs open.

In these drawings I have illustrated one embodiment of my invention and have shown the same as comprising an elongated body portion or supporting frame which, in the form here shown, comprises two side members 1 arranged parallel one with the other, spaced apart and rigidly connected one to the other by connecting members or collars 2, 3 and 4 and by an end piece 5. This elongated body portion is provided at its rear end with a hand grip which, in the present instance, is formed by bending outwardly in opposite directions the end portions of the side members 1 of the body portion and in connecting the same to form an elongated loop, as shown at 6. The end piece 5 to which the forward end portions of the side piece 1 of the body portion are secured is preferably slightly pointed and has its inner portion bifurcated or recessed to receive barbs 7 which are pivotally mounted on said end piece by means of a single pivot pin and are so arranged and of such shape and size that they may be folded into positions between and substantially parallel with the side members 1 of the elongated body portion.

The barbs are acted upon by suitable springs to retain the same normally in their closed or folded positions and a suitable actuating device is provided for forcing the barbs outwardly into their extended positions, in which positions they extend substantially at right angles to the length of the body portion. As here shown, this actuating device comprises a rod 9 slidably mounted in the connecting members or collars 2, 3 and 4 and having at that end adjacent to the barbs a head 10 which is slightly tapered and adapted to engage between the barbs and spread them apart, thus causing the points of the two barbs to project beyond the respective sides of the body portion. The actuating device and the barbs are held in their retracted positions by a spring 11 which is coiled about the rod 9 and confined between the connecting member 3 and a collar 12 rigidly secured to the rod. The collar 12 abuts against the spacing member 2 to limit the rearward movement of the rod under the influence of the spring. The rod 9 extends rearwardly through an opening in the outer portion of the hand grip 6 and is pivoted with a knob or hand piece 13 which is so arranged that it may be engaged by the upper portion of the hand which grasps the hand grip 6 and the actuating device thus operated by one hand. The springs which retain the barbs in their closed positions may take various forms but they are here shown in the form of elongated loops of resilient wire 14, the inner ends of which are mounted in a collar 15 rigidly secured to the rod 9 so that the springs will be advanced with that rod. The loop springs straddle the rear ends of the barbs and the transverse portions at the outer ends of the springs rest upon the lateral edges of the barbs at points spaced a considerable distance from the axes of the barbs and thus hold the latter in their closed positions. When the actuating device or plunger is pressed forwardly the head 10 will spread the barbs apart against the tension of the springs but the springs will travel forwardly toward the axes of the barbs so as to permit the points of the barbs to pass outwardly through the loop springs. The length of the springs is such that when the plunger is in its foremost position and the barbs fully extended, as shown in Fig. 3, the transverse portions of the loop springs will extend forwardly beyond the axes of the barbs, thus permitting the latter to fully open. When the pressure on the plunger is relieved the spring 11 will move the same rearwardly and thus retract the head 10 and the springs 14 and the latter will engage the barbs to return the same to their closed positions. Preferably a cord 16 is secured to the hand grip of the device and provided with a hook or pin 17 by means of which it may be attached to the belt or clothing of the fisherman to prevent the loss of the gaff in the event it should be dropped. The pin 17 is preferably provided with a hook 19 upon which the gaff may be supported when not in use. In the present construction the hand grip of the gaff is provided with a ring 18 to which the cord 16 is connected and through which the hook 19 may be inserted to enable the gaff to be supported on the hook.

The manner in which the device is used will be readily understood and it will be apparent that when a fisherman has hooked a fish and brought the same to the surface he will grasp the hand grip of the gaff in one hand, insert the outer end thereof in the open mouth of the fish and then actuate the plunger to open the barbs, first turning the gaff into such a position that the barbs will engage, respectively, the upper and lower jaws of the fish. The barbs are opened such a distance as to firmly engage the jaws of the fish and thus permit it to be lifted from the water by the gaff. After the fish has been landed the barbs are still held in their open positions, thus retaining the mouth of the fish open, until the hook has been removed from the mouth of the fish. Then the pressure is relieved on the plunger and the gaff moved forwardly a slight distance to release the barbs from the mouth of the fish and the gaff withdrawn.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A device of the character described, comprising an elongated body portion having a hand grip at the rear end thereof, barbs pivotally mounted near the forward end of said body portion with their points toward the rear end thereof, and a reciprocatory actuating device mounted on said body portion, having its forward end arranged to move said barbs outwardly about their axes and having its rear end arranged to be engaged by the hand of the operator.

2. A device of the character described, comprising an elongated body portion having a hand grip at the rear end thereof, barbs pivotally mounted near the forward end of said body portion with their points toward the rear end thereof, an actuating device extending lengthwise of said body portion to move said barbs outwardly about their axes, and a spring to retain said actuating device normally in its retracted position, said actuating device having a part arranged adjacent to said hand grip for moving said actuating device against the action of said spring.

3. A device of the character described, comprising an elongated body portion having a hand grip at the rear end thereof, barbs pivotally mounted near the forward end of said body portion, means for holding said barbs normally in inoperative positions substantially parallel with said body portion and with their points toward the rear end thereof, and an actuating device movably mounted on said body portion, arranged to move said barbs into operative positions extending transversely to said body portion and having a part arranged adjacent to said hand grip.

4. A device of the character described, comprising an elongated body portion having a hand grip at the rear end thereof, barbs pivotally mounted at their forward ends near the forward end of said body portion, means for holding said barbs normally in position substantially parallel with said body portion with their points toward the rear end thereof, and a plunger mounted in said body portion for reciprocatory movement, having one end extending between said barbs to move them outwardly in opposite directions about their axes and having at its other end a part arranged to be engaged by the hand which grasps said hand grip.

5. A device of the character described, comprising an elongated body portion having a hand grip at the rear end thereof, barbs having their forward ends pivotally mounted near the forward end of said body portion, means for holding said barbs normally in positions substantially parallel with said body portion with their points toward the rear end thereof, a plunger slidably mounted in said body portion, extending lengthwise thereof and having at its forward end a part to engage said barbs to move them outwardly in opposite directions about their axes and having a part to be engaged by the hand which grasps said hand grip, and a spring acting on said plunger to move the same in one direction and to cause said holding means to move said barbs to their normal positions.

6. A device of the character described, comprising an elongated body portion, barbs having their forward ends pivotally mounted near the forward end of said body portion and extending rearwardly from their axes along said body portion, an actuating device mounted for movement lengthwise of said body portion and having a part to engage said barbs and move the same outwardly in opposite directions about their axes, springs acting on said barbs to retain the same normally in the first mentioned positions and connected with said actuating device for movement therewith to permit said barbs to be moved outwardly, and means other than said springs for manipulating said actuating device.

7. A device of the character described, comprising an elongated body portion, barbs pivotally mounted near the forward end of said body portion and movable into positions substantially parallel with said body portion, an actuating device mounted for movement lengthwise of said body portion and having a part to engage said barbs and move the same outwardly in opposite directions about their axes, resilient members secured to and movable with said actuating device and having near their forward ends parts arranged to engage the outer edges of the respective barbs to resist the outward movement thereof, said resilient members being so arranged that the operative movement of said actuating device will carry said parts thereof forwardly to permit the opening of said barbs, a spring acting on said actuating device to hold the same normally in its inoperative position, and means for moving said actuating device forwardly against the action of said spring.

8. A device of the character described, comprising an elongated body portion, barbs pivotally mounted near the forward end of said body portion and movable into positions substantially parallel with said body portion, an actuating device mounted for movement lengthwise of said body portion and having a part to engage said barbs and move the same outwardly in opposite directions about their axes, elongated loops of resilient material arranged on the opposite sides of said body portion, rigidly secured to said actuating device at their inner ends and having the transverse portions at the outer ends thereof engaging the outer edges of the respective barbs, each of said loops being so arranged with relation to the adjacent barb that as said actuating device is moved forwardly said barbs will extend through the loops and may thus be moved to their extended positions, a spring for moving said actuating device rearwardly, and means for moving said actuating device forwardly against the tension of said spring.

9. In a device of the character described, an elongated frame comprising substantially parallel members spaced apart, connecting members arranged between the two parts of said frame and rigidly connected therewith, said connecting members having openings therethrough to form bearings, a transverse hand grip arranged at the rear end of said frame, an end piece rigidly secured to the forward ends of the two parts of said frame to connect the latter one to the other, barbs pivotally mounted on said end piece for movement into and out of the space between the two parts of said frame, a plunger slidably mounted in said connecting members and having at its forward end a part to engage said barbs and move the same outwardly in opposite directions, elongated resilient members rigidly secured to said plunger, extending beyond said part of said plunger and having parts to engage the outer edges of the respective barbs to hold the latter in their innermost positions, a spring acting on said plunger to retract the same, and a part carried by said plunger and arranged adjacent to said hand grip for moving said plunger forwardly against the tension of said spring.

In testimony whereof, I affix my signature hereto.

HARRY D. KEELER.